US006570354B1

(12) United States Patent
Dobbertin et al.

(10) Patent No.: US 6,570,354 B1
(45) Date of Patent: May 27, 2003

(54) SYSTEM AND METHOD FOR INCREASED SHEET TIMING OPERATION WINDOW FOR REGISTRATION

(75) Inventors: Michael T. Dobbertin, Honeoye, NY (US); John A. Winterberger, Spencerport, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 7 days.

(21) Appl. No.: 09/698,513

(22) Filed: Oct. 27, 2000

(51) Int. Cl.[7] ................................................ G05B 11/01

(52) U.S. Cl. ....................................... 318/560; 271/3.15

(58) Field of Search ............................... 271/3.15, 3.16, 271/226; 318/560, 685, 696

(56) References Cited

U.S. PATENT DOCUMENTS 5,094,442 A 3/1992 Kamprath et al. .......... 271/227
5,262,937 A * 11/1993 Mackin et al. .......... 346/139 D
5,322,273 A 6/1994 Rapkin et al. .............. 271/227
5,731,680 A 3/1998 Winterberger et al. ...... 318/685

* cited by examiner

*Primary Examiner*—Jeffrey Donels

(57) ABSTRACT

An apparatus and method for moving a receiver into a registered relationship with a moving image-bearing member in a registration mechanism. The apparatus and method account for receivers that arrive at the registration mechanism outside a normal operating time window. When a receiver arrives too late, the receiver is accelerated to a speed greater than that of the moving image-bearing member for a period of time sufficient to account for the arrival delay. The receiver is then decelerated to a speed substantially equal to that of the image-bearing member. When a receiver arrives too early, the receiver is brought to a stop for a period of time sufficient to account for the early arrival. The receiver is then accelerated to the image-bearing member speed.

15 Claims, 8 Drawing Sheets

SYSTEM AND METHOD FOR INCREASED SHEET TIMING OPERATION WINDOW FOR REGISTRATION

BACKGROUND OF THE INVENTION

1. Field of the Invention

This invention relates to electrophotographic reproduction apparatus and methods for registering sheets and more particularly to apparatus and methods for control of a stepper motor drive for controlling movement of a receiver sheet into transfer relationship with an image-bearing member that supports an image to be transferred to the receiver sheet.

2. Brief Description of Available Systems

In known electrophotographic copier, printers or duplicators the problem of accurate registration of a receiver sheet with a moving member supporting an image for transfer to the sheet is well known. In this regard, reference is made to U.S. Pat. No. 5,322,273, the contents of which are incorporated herein by reference.

Typically, an electrophotographic latent image is formed on the member and this image is toned and then transferred to a receiver sheet directly or transferred to an intermediate image-bearing member and then to the receiver sheet. In moving of the receiver sheet into transfer relationship with the image-bearing member, it is important to adjust the sheet for skew. Once the skew of the sheet is corrected, it is advanced by rollers driven by stepper motors towards the image-bearing member. During the skew control adjustment, the adjustment is implemented by selectively driving the stepper motor driven rollers, which are controlled independently of movement of the image-bearing member. Typically, movement of the receiver sheet and operations performed thereon by various stations are controlled using one or more encoders. Known registration control systems use a transfer roller with which an encoder wheel is associated. This encoder is used for controlling registration of the sheet. For instance, a registration apparatus is disclosed in U.S. Pat. No. 5,731,680, the contents of which are incorporated herein by reference.

However, previous registration apparatus and methods have been limited in that they can only process and register receiver sheets that arrive at the registration mechanism within a narrow operating time window. Sheets that arrive too early or too late can result in erroneous registration or they can cause the registration system to stop and provide an error indication. It is, therefore, an object of the invention to provide improved methods and apparatus for ensuring accurate registration of receiver sheets that arrive in a larger operating time window.

BRIEF SUMMARY OF THE PREFERRED EMBODIMENTS

In accordance with one aspect of the invention, there is provided an apparatus for moving a receiver into a registered relationship with a moving image-bearing member. The apparatus includes a motor and a drive member that engages the receiver. A drive coupling is provided to connect the motor to the drive member. The apparatus also includes a sensor that detects a lead edge of the receiver and a timer that determines the delay time between actual detection of the receiver by the sensor and the expected time of detection. Means are provided for controlling the motor to accelerate the movement of the receiver to a speed greater than the image-bearing member speed for a period of time sufficient to account for the amount of delay time, and to decelerate movement of the sheet to a speed substantially equal to the image-bearing member speed.

In accordance with another aspect of the invention, there is provided another apparatus for moving a receiver into a registered relationship with a moving image-bearing member. The apparatus includes a motor and a drive member that engages the receiver. A drive coupling is provided to connect the motor to the drive member. The apparatus also includes a sensor that detects a lead edge of the receiver and a timer that determines the delay time between actual detection of the receiver by the sensor and the expected time of detection. Means are provided to stop the movement of the receiver for a period of time sufficient to maintain a gap between the receiver and a preceding receiver based the time at which the receiver was detected by the sensor, and to accelerate the movement of the receiver to a speed substantially equal to the image-bearing member speed.

In accordance with yet another aspect of the invention, there is provided a method of moving a receiver into a registered relationship with a moving image-bearing member in a registration mechanism. The method includes the step of determining that the receiver arrived at the registration mechanism an amount of delay time later than expected. The movement of the receiver is then accelerated to a speed greater than the image-bearing member speed for a period of time sufficient to account of the amount of delay time. Then the movement of the receiver is decelerated to a speed substantially equal to the image-bearing member speed.

In accordance with a further aspect of the present invention, there is provided a method of moving a receiver into a registered relationship with a moving image-bearing member in a registration mechanism. The method includes the step of determining that the receiver arrived at the registration mechanism an amount of delay time earlier than expected. The receiver is then brought to a stop for a period of time sufficient to account for the amount of time by which the receiver arrived early. Movement of the receiver sheet is then accelerated to a speed substantially equal to the image-bearing member speed.

The invention and its various advantages will become more apparent to those skilled in the art from the ensuing detailed description of preferred embodiments, reference being made to the accompanying drawings.

BRIEF DESCRIPTION OF THE DRAWINGS

The subsequent description of the preferred embodiments of the present invention refers to the attached drawings, wherein.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art.

Figure 1:
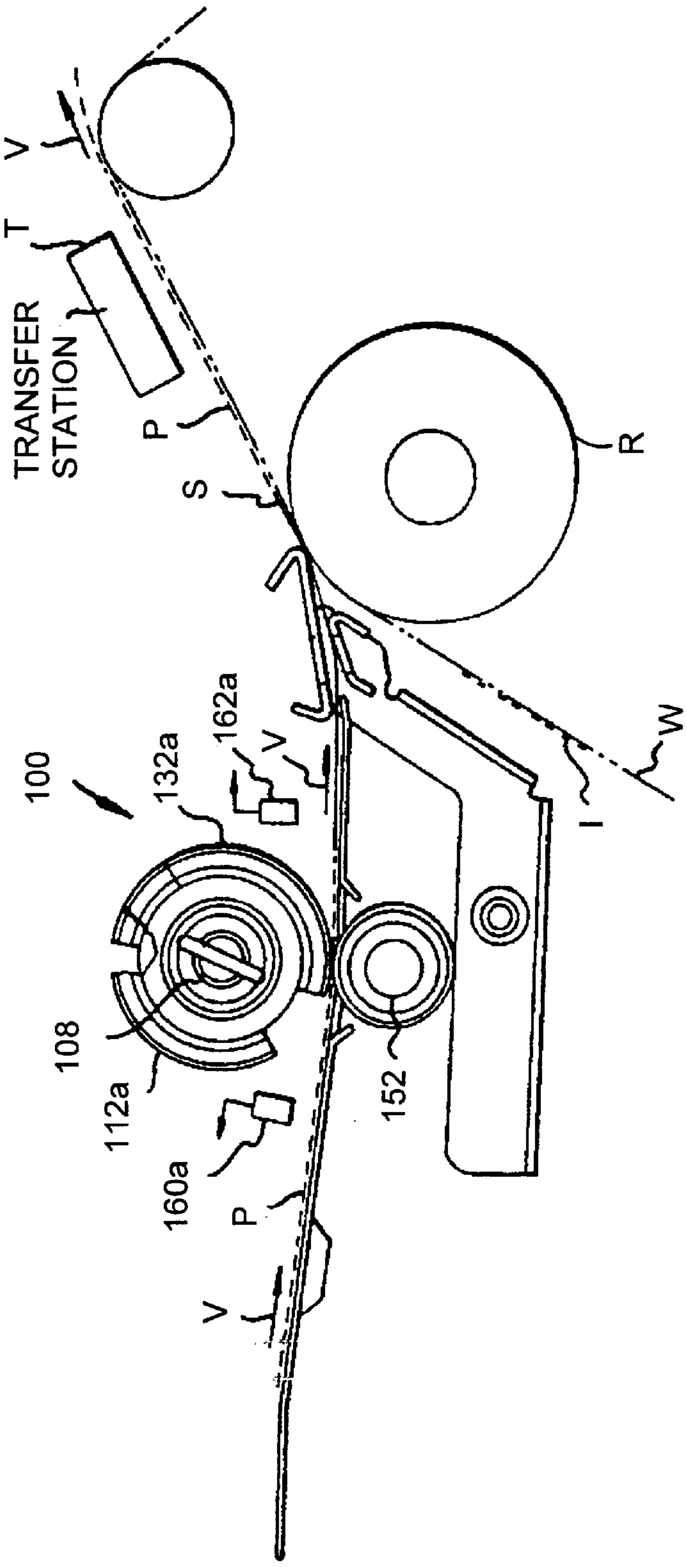
FIG. 1 is a side elevational view of a sheet registration mechanism, partly in cross-section, and with portions removed to facilitate viewing.
Figure 2:
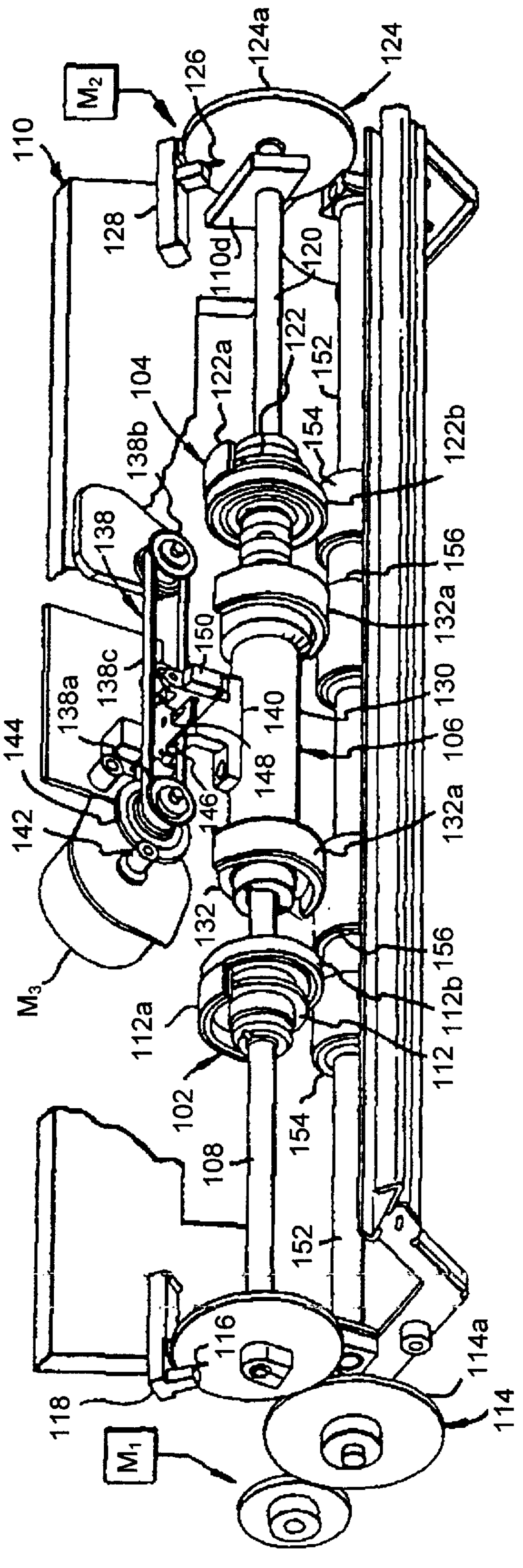
FIG. 2 is a view, in perspective, of the sheet registration mechanism of FIG. 1, with portions removed or broken away to facilitate viewing.
Figure 3:
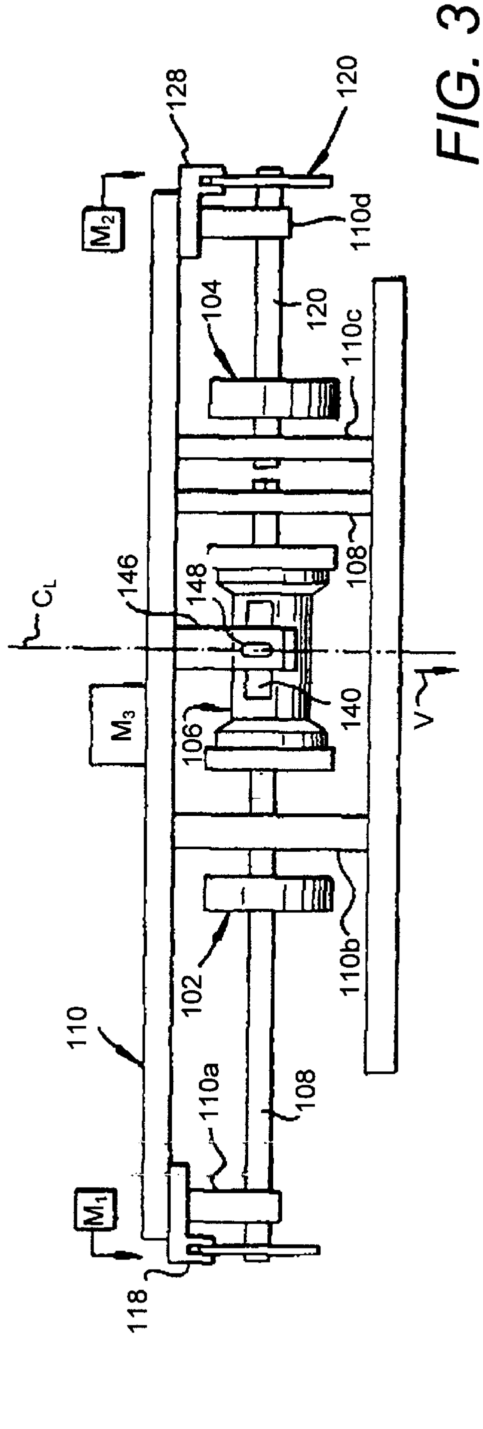
FIG. 3 is a top plan view of the sheet registration mechanism of FIG. 1, with portions removed or broken away to facilitate viewing.

Referring now to the accompanying drawings, FIGS. 1–3 best show the sheet registration mechanism, designated generally by the numeral 100, according to this invention. The sheet registration mechanism 100 is located in association with a substantially planar sheet transport path P of any well known device where sheets are transported seriatim from a supply (not shown) to a station where an operation is performed on the respective sheets. For example, the device may be a reproduction apparatus, such as a copier or printer or the like, where marking particle developed images of original information, are placed on receiver sheets. As shown in FIG. 1, the marking particle developed images (e.g., image 1) are transferred at a transfer station T from an image-bearing member such as a movable web or drum (e.g., web W) to a sheet of receiver material (e.g., a cut sheet S of plain paper or transparency material) moving along the path P. A transfer roller R guides the web W.

In reproduction apparatus of the above type, it is desired that the sheet S be properly registered with respect to a marking particle developed image in order for the image to be placed on the sheet in an orientation to form a suitable reproduction for user acceptability. Accordingly, the sheet registration mechanism 100 provides for alignment of the receiver sheet in a plurality of orthogonal directions. That is, the sheet is aligned, with the marking particle developed image, by the sheet registration mechanism by removing any skew in the sheet (angular deviation relative to the image), and moving the sheet in a cross-track direction so that the centerline of the sheet in the direction of sheet travel and the centerline of the marking particle image are coincident. Further, the sheet registration mechanism 100 times the advancement of the sheet along the path P such that the sheet and the marking particle image are aligned in the in-track direction as the sheet travels through the transfer station T.

In order to accomplish skew correction and cross-track and in-track alignment of the receiver with respect to the image-bearing member, one or more drive members are operable to engage the receiver. For example, to register the sheet S with respect to a marking particle developed image on the moving web W, the sheet registration apparatus 100 includes first and second independently driven roller assemblies 102, 104, and a third roller assembly 106. The first roller assembly 102 includes a first shaft 108 supported adjacent its ends in bearings 110*a*, 110*b* mounted on a frame 110. Support for the first shaft 108 is selected such that the first shaft is located with its longitudinal axis lying in a plane parallel to the plane through the sheet transport path P and substantially perpendicular to the direction of a sheet traveling along the transport path in the direction of arrows V (FIG. 1). A first urging drive roller 112 is mounted on the first shaft 108 for rotation therewith. The urging roller 112 has an arcuate peripheral segment 112*a* extending about 180° around such roller. The peripheral segment 112*a* has a radius to its surface measured from the longitudinal axis of the first shaft 108 substantially equal to the minimum distance of such longitudinal axis from the plane of the transport path P.

One or more motors are operable to drive the drive members via a drive coupling. For example, a first stepper motor $M_1$, mounted on the frame 110, is operatively coupled to the first shaft 108 through a gear train 114 to rotate the first shaft when the motor is activated. The gear 114*a* of the gear train 114 incorporates an indicia 116 detectable by a suitable sensor mechanism 118. The sensor mechanism 118 can be either optical or mechanical depending upon the selected indicia. Location of the sensor mechanism 118 is selected such that when the indicia 116 is detected, the first shaft 108 will be angularly oriented to position the first urging roller 112 in a home position. The home position of the first urging roller is that angular orientation where the surface of the arcuate peripheral segment 112*a* of the roller 112, upon further rotation of the shaft 108, will contact a sheet in the transport path P (see FIG. 7*a*).

The second roller assembly 104 includes a second shaft 120 supported adjacent its ends in bearings 110*c*, 110*d* mounted on the frame 110. Support of the second shaft 120 is selected such that the second shaft is located with its longitudinal axis lying in a plane parallel to the plane through the sheet transport path P and substantially perpendicular to the direction of a sheet traveling along the transport path. Further, the longitudinal axis of the second shaft 120 is substantially coaxial with the longitudinal axis of the first shaft 108.

Figures 7A, 7B, 7C, 7D, 7E, 7F:
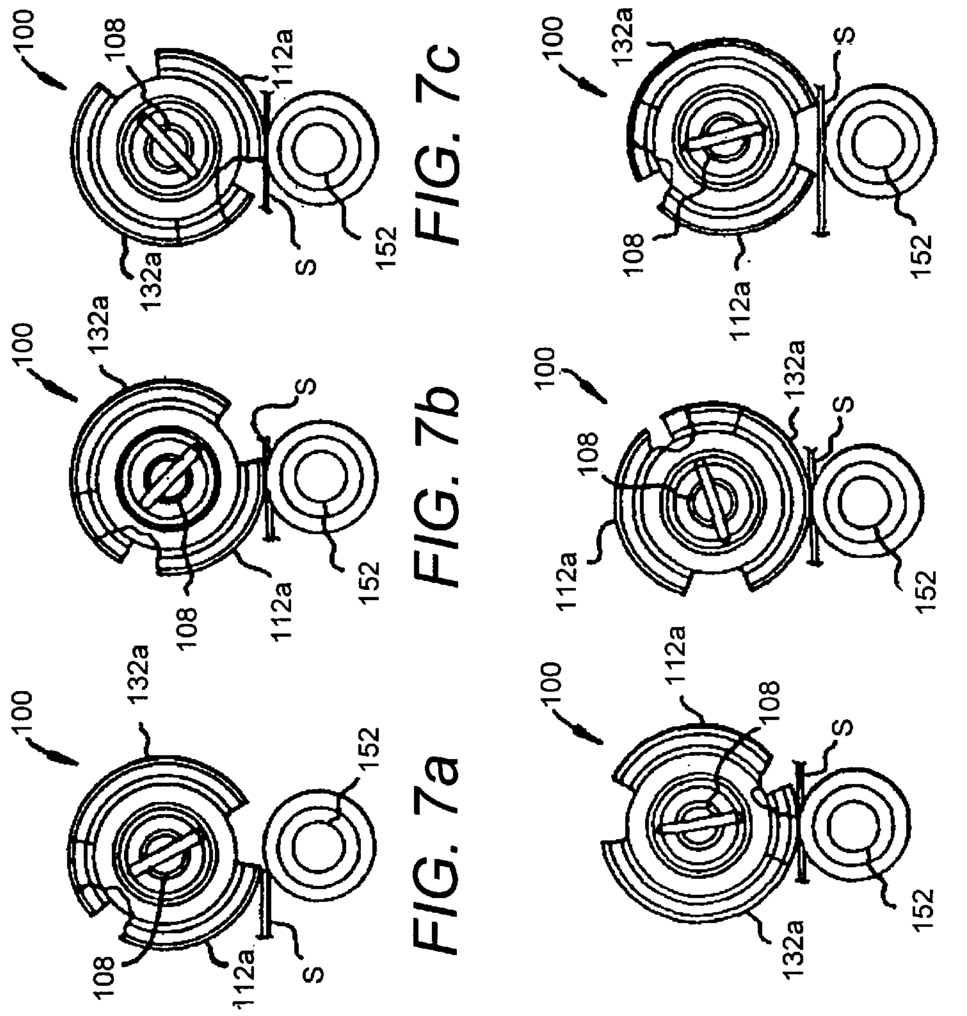
FIGS. 7*a*–7*f* are respective side elevational views of the urging rollers of the sheet registration mechanism of FIG. 1 at various time intervals in the operation of the sheet registration mechanism.

A second urging drive roller 122 is mounted on the second shaft 120 for rotation therewith. The urging roller 122 has an arcuate peripheral segment 122*a* extending about 180° around such roller. The peripheral segment 122*a* has a radius to its surface measured from the longitudinal axis of the first shaft 108 substantially equal to the minimum distance of such longitudinal axis from the plane of the transport path P. The arcuate peripheral segment 122*a* is angularly coincident with the arcuate peripheral segment 112*a* of the urging roller 112. A second independent stepper motor $M_2$, mounted on the frame 110, is operatively coupled to the second shaft 120 through a gear train 124 to rotate the second shaft when the motor is activated. The gear 124*a* of the gear train 124 incorporates an indicia 126 detectable by a suitable sensor mechanism 128. The sensor mechanism 128, adjustably mounted on the frame 110, can be either optical or mechanical depending upon the selected indicia. Location of the sensor mechanism 128 is selected such that when the indicia 126 is detected, the second shaft 120 will be angularly oriented to position the second urging roller 122 in a home position. The home position of the second urging roller is that angular orientation where the surface of the arcuate peripheral segment 122*a* of the roller 122, upon further rotation of the shaft 120, will contact a sheet in the transport path P (same as the angular orientation of the peripheral segment 112*a* as shown in FIG. 7*a*).

Figure 4:
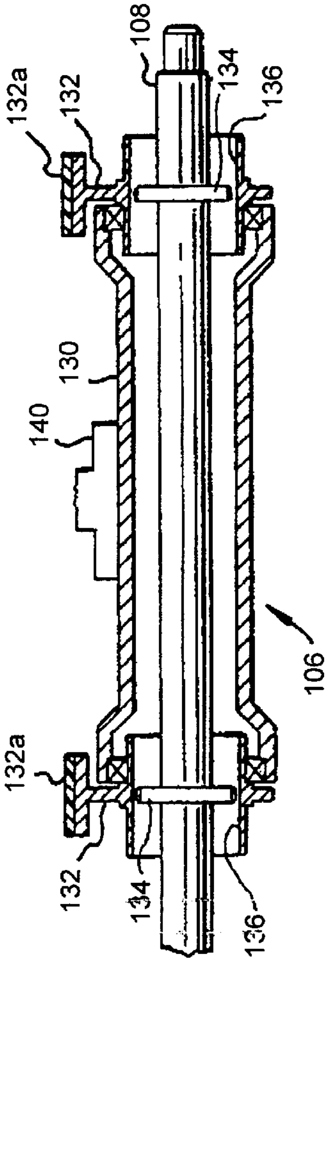
FIG. 4 is a front elevational view, in cross-section of the third roller assembly of the sheet registration mechanism of FIG. 1.

The third roller assembly 106 includes a tube 130 surrounding the first shaft 108 and capable of movement relative to the first shaft in the direction of the longitudinal axis thereof. A pair of third urging drive rollers 132 are mounted on the first shaft 108, supporting the tube 130 for relative rotation with respect to the third urging rollers. The third urging rollers 132 respectively have an arcuate peripheral segment 132*a* extending about 180° around each roller. The peripheral segments 132*a* each have a radius to its respective surface measured from the longitudinal axis of the first shaft 108 substantially equal to the minimum distance of such longitudinal axis from the plane of the transport path P. The arcuate peripheral segments 132*a* are angularly offset with respect to the arcuate peripheral segments 112*a*, 122*a* of the first and second urging rollers. The pair of third urging rollers 132 are coupled to the first shaft 108 by a key or pin 134 engaging a slot 136 in the respective rollers (FIG. 4). Accordingly, the third urging rollers 132 will be rotatably driven with the first shaft 108 when the first shaft is rotated by the first stepper motor $M_1$, and are movable in the direction along the longitudinal axis of the first shaft with the tube 130. For the purpose to be more fully explained below, the angular orientation of the third urging rollers 132 is such that the arcuate peripheral segments 132*a* thereof are offset relative to the arcuate peripheral segments 112*a* and 122*a*.

A third independent stepper motor $M_3$, mounted on the frame 110, is operatively coupled to the tube 130 of the third roller assembly 106 to selectively move the third roller assembly in either direction along the longitudinal axis of the first shaft 108 when the motor is activated. The operative coupling between the third stepper motor $M_3$ and the tube 130 is accomplished through a pulley and belt arrangement 138. The pulley and belt arrangement 138 includes a pair of pulleys 138*a*, 138*b*, rotatably mounted in fixed spatial relation, for example, to a portion of the frame 110. A drive belt 138*c* entrained about the pulleys is connected to a bracket 140 which is in turn connected to the tube 130. A drive shaft 142 of the third stepper motor $M_3$ is drivingly engaged with a gear 144 coaxially coupled to the pulley 138*a*. When the stepper motor $M_3$ is activated, the gear 144 is rotated to rotate the pulley 138*a* to move the belt 138*c* about its closed loop path. Depending upon the direction of rotation of the drive shaft 142, the bracket 140 (and thus the third roller assembly 106) is selectively moved in either direction along the longitudinal axis of the first shaft 108.

A plate 146 connected to the frame 110 incorporates an indicia 148 detectable by a suitable sensor mechanism 150. The sensor mechanism 150, adjustably mounted on the bracket 140, can be either optical or mechanical depending upon the selected indicia. Location of the sensor mechanism 150 is selected such that when the indicia 148 is detected, the third roller assembly 106 is located in a home position. The home position of the third roller assembly 106 is selected such that the third roller assembly is substantially centrally located relative to the cross-track direction of a sheet in the transport path P. U.S. Pat. No. 5,731,680 and co-pending U.S. Pat. App. Serial No. 09/698512 SYSTEM AND METHOD FOR IMPROVED REGISTRATION PERFORMANCE, the contents of which are incorporated herein by reference. The controller receives input signals from a plurality of sensors associated with the sheet registration mechanism 100 and a downstream operation station. Based on such signals and an operating program, the controller produces appropriate signals to control the independent stepper motors $M_1$, $M_2$, and $M_3$ of the sheet registration mechanism.

For the operation of the sheet registration mechanism 100, referring now particularly to FIGS. 5, 6 and 7*a*–7*f*, a sheet S traveling along the transport path P is moved into the vicinity of the sheet registration mechanism by an upstream transport assembly including non-separable nip rollers (not shown). Such sheet may be oriented at an angle (e.g., angle a in FIG. 5) to the centerline $C_L$ of the path P and may have its center A spaced a distance from the path centerline (e.g., distance d in FIG. 5). The angle $\alpha$ and distance d, which are undesirable, are of course generally induced by the nature of the upstream transport assembly and are variable sheet-to-sheet.

Figure 5:
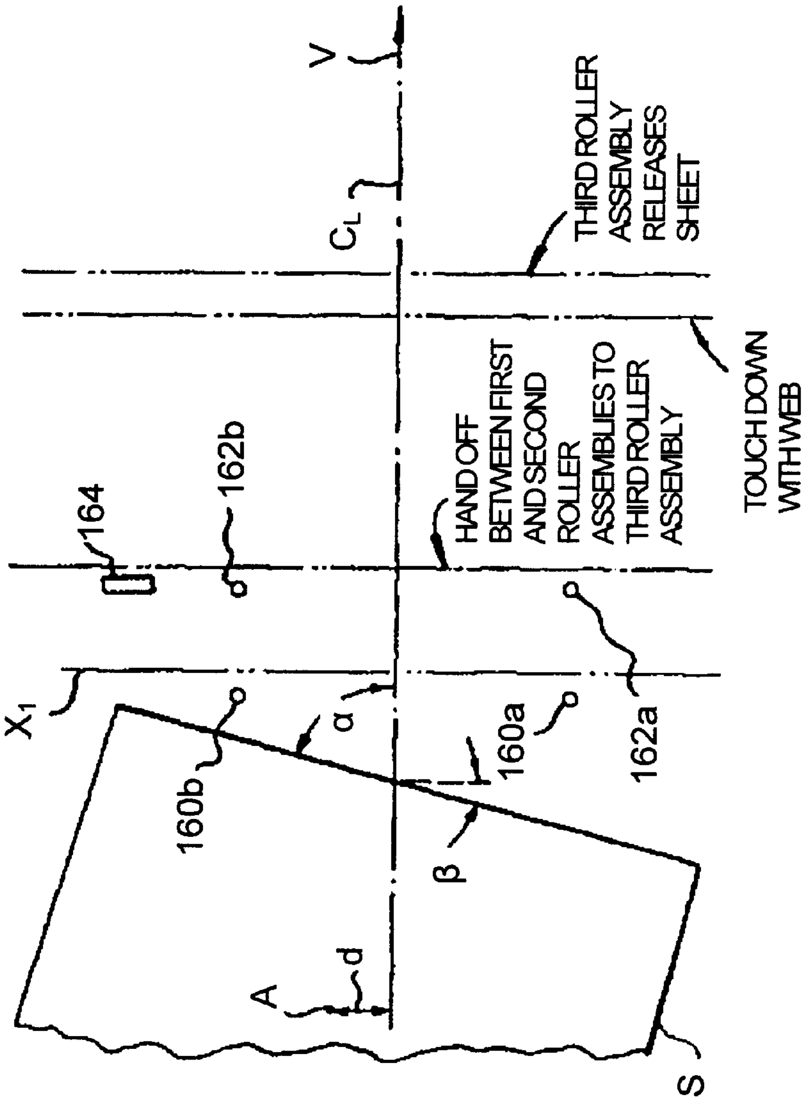
FIG. 5 is top schematic illustration of the sheet transport path showing the actions of the sheet registration mechanism of FIG. 1 on an individual sheet as it is transported along a transport path.

A pair of nip sensors 160*a*, 160*b* is located upstream of the plane $X_1$ (see FIG. 5). The plane $X_1$ is defined as including the longitudinal axes of the urging rollers (112, 122, 132) and the rollers of the idler roller pairs (154, 156). The nip sensors 160*a*, 160*b* may, for example, be of either the optical or mechanical type. Nip sensor 160*a* is located to one side (in the cross-track direction) of the centerline $C_L$, while nip sensor 160*b* is located a substantially equal distance to the opposite side of the centerline $C_L$.

When the sensor 160*a* detects the lead edge of a sheet transported along the path P, it produces a signal which is sent to the controller for the purpose of activating the first stepper motor $M_1$. In a like manner, when the sensor 160*b* detects the lead edge of a sheet transported along the path P, it produces a signal which is sent to the controller for the purpose of activating the second stepper motor $M_2$. If the sheet S is at all skewed relative to the path P, the lead edge to one side of the centerline $C_L$ will be detected prior to detection of the lead edge at the opposite side of the centerline (of course, with no skew, the lead edge detection at opposite sides of the centerline will occur substantially simultaneously).

Figure 6:
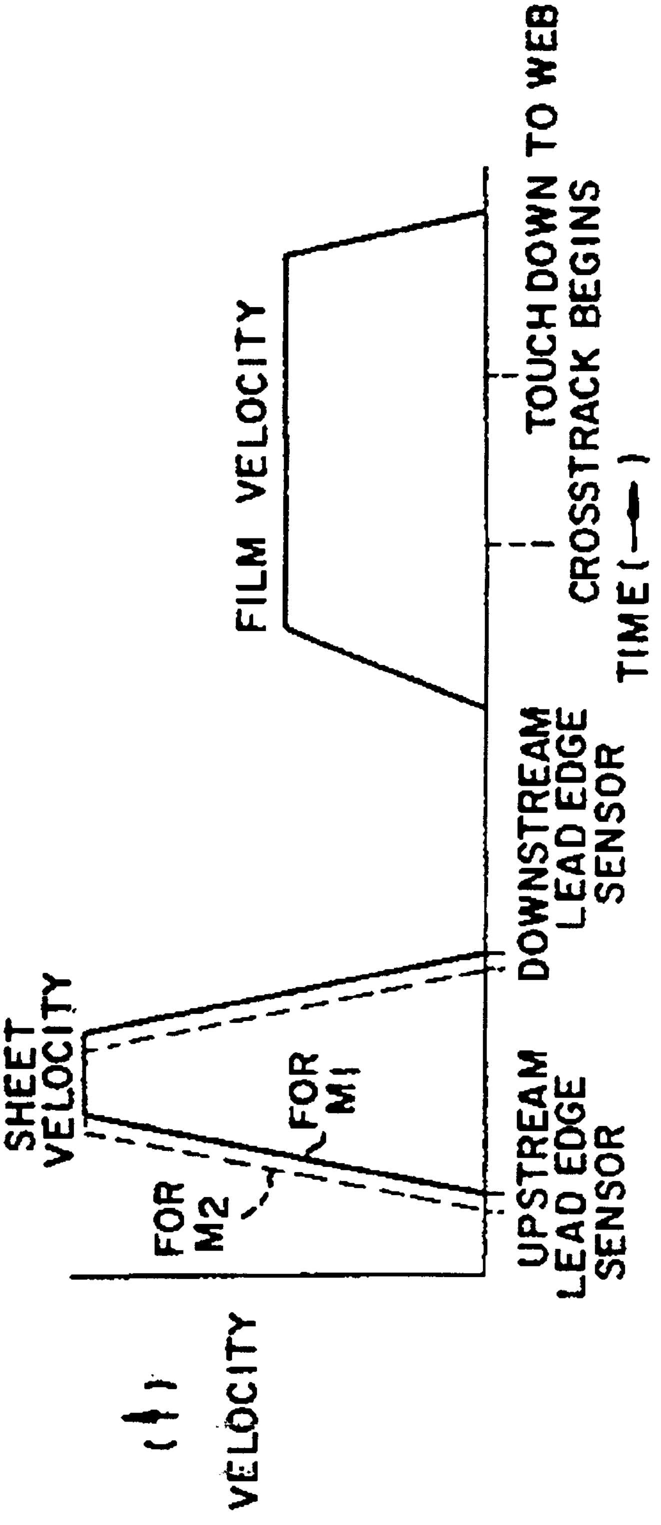
FIG. 6 is a graphical representation of the peripheral velocity profile over time for the urging rollers of the sheet registration mechanism of FIG. 1.

As shown in FIG. 6, when the first stepper motor $M_1$ is activated by the controller, it will ramp up to a speed such that the first urging roller 112 will be rotated at an angular velocity to yield a predetermined peripheral speed for the arcuate peripheral segment 112*a* of such roller substantially equal to the entrance speed of a sheet transported along the path P. When the portion of the sheet S enters the nip between the arcuate peripheral segment 112*a* of the first urging roller 112 and the associated roller of the idler roller pair 154, such sheet portion will continue to be transported along the path P in a substantially uninterrupted manner (see FIG. 7*b*).

Likewise, when the second stepper motor $M_2$ is activated by the controller, it will ramp up to a speed such that the second urging roller 122 will be rotated at an angular velocity (substantially the same as the angular velocity of the first urging roller) to yield a predetermined peripheral speed for the arcuate peripheral segment 122*a* of such roller substantially equal to the speed of a sheet transported along the path P. When the portion of the sheet S enters the nip between the arcuate peripheral segment 122*a* of the second urging roller 122 and the associated roller of the idler roller pair 154, such sheet portion will continue to be transported along the path P in a substantially uninterrupted manner. As seen in FIG. 5, due to the angle $\alpha$ of the sheet S, sensor 160*b* will detect the sheet lead edge prior to the detection of the lead edge by the sensor 160*a*. Accordingly, the stepper motor $M_2$ will be activated prior to activation of the motor $M_1$.

A pair of in-track sensors 162*a*, 162*b* is located downstream of the plane $X_1$. As such, the in-track sensors 162*a*, 162*b* are located downstream of the nips formed respectively by the arcuate peripheral segments 112*a*, 122*a* and their associated rollers of the idler roller pairs 154. Thus, the sheet S will be under the control of such nips. The in-track sensors 162*a*, 162*b* may, for example, be of either the optical or mechanical type. Sensor 162*a* is located to one side (in the cross-track direction) of the centerline $C_L$, while (substantially complementary to the angle a) will square up the sheet and remove the skew in the sheet relative to the transport path P to properly align the lead edge thereof.

Once the skew has been removed from the sheet, as set forth in the above description of the first portion of the operative cycle of the sheet registration mechanism 100, the sheet is ready for subsequent cross-track alignment and registered transport to a downstream location. A sensor 164, such as a set of sensors (either optical or mechanical as noted above with reference to other sensors of the registration mechanism 100) aligned in the cross-track direction (see FIG. 5), detects a lateral marginal edge of the sheet S and produces a signal indicative of the location thereof.

The signal from the sensor 164 is sent to the controller where the operating program will determine the distance (e.g., distance d shown in FIG. 5) of the center A of the sheet from the centerline $C_L$ of the transport path P. At an appropriate time determined by the operating program, the first stepper motor $M_1$ and the second stepper motor $M_2$ will be activated. The first urging roller 112 and the second urging roller 122 will then begin rotation to start the transport of the sheet toward the downstream direction (see FIG. 7*d*). The stepper motors will ramp up to a speed such that the urging rollers of the roller assemblies 102, 104, and 106 will be rotated at an angular velocity to yield a predetermined peripheral speed for the respective portions of the arcuate peripheral segments thereof. Such predetermined peripheral speed is, for example, substantially equal to the speed of the web W. While other predetermined peripheral speeds are suitable, it is important that such speed be substantially equal to the speed of the web W when the sheet S touches down at the web.

Of course, in view of the above coupling arrangement for the third roller assembly 106, rotation of the third urging rollers 132 will also begin when the first stepper motor $M_1$ is activated. As will be appreciated from FIGS. 7*a*–7*d*, up to this point in the operative cycle of the sheet registration mechanism 100, the arcuate peripheral segments 132*a* of the third urging rollers 132 are out of contact with the sheet S and have no effect thereon. Now the arcuate peripheral segments 132*a* engage the sheet (in the nip between the arcuate peripheral segments 132*a* and the associated rollers of the idler roller pair 156) and, after a degree of angular rotation, the arcuate peripheral segments 112*a* and 122*a* of the respective first and second urging rollers leave contact with the sheet (see FIG. 7*e*). The control over the sheet is thus handed off from the nips established by the arcuate peripheral segments of the first and second urging rollers and the idler roller pair 154 to the arcuate peripheral segments of the third urging rollers and the idler roller pair 156 such that the sheet is under control of only the third urging rollers 132 for transport of the sheet along the path P.

At a predetermined time, once the sheet is solely under the control of the third urging rollers 132, the controller activates the third stepper motor $M_3$.

Based on the signal received from sensor 164 and the operating program of the controller, the stepper motor $M_3$ will drive the third roller assembly 106, through the above-described belt and pulley arrangement 138, in an appropriate direction and for an appropriate distance in the cross-track direction. Accordingly, the sheet in the nips between the arcuate peripheral segments of the third urging rollers 132 and the associated rollers of the idler roller pair 156 is urged in a cross-track direction to a location where the center A of the sheet coincides with the centerline $C_L$ of the transport path P to provide for the desired cross-track alignment of the sheet.

The third urging rollers 132 continue to transport the sheet along the transport path P at a speed substantially equal to the speed of the web W until the lead edge touches down on the web, in register with the image I carried by the web. At this point in time, the angular rotation of the third urging rollers 132 brings the arcuate peripheral segments 132*a* of such rollers out of contact with the sheet S (see FIG. 7*f*). Since the arcuate peripheral segments 112*a* and 122*a* of the respective first and second urging rollers 112 and 122 are also out of contact with the sheet, such sheet is free to track with the web W undisturbed by any forces which might otherwise have been imparted to the sheet by any of the urging rollers.

At the time the first, second and third urging rollers are all out of contact with the sheet, the stepper motors $M_1$, $M_2$, and $M_3$ are activated for a time, dependent upon signals to the controller from the respective sensors 118,128, and 150, and then deactivated. As described above, such sensors are home position sensors. Accordingly, when the stepper motors are deactivated, the first, second, and third urging rollers are respectively located in their home positions. Therefore, the roller assemblies 102,104,106 of the sheet registration mechanism 100 according to this invention are located as shown in FIG. 7*a*, and the sheet registration mechanism is ready to provide skew correction and cross-track and in-track alignment for the next sheet transported along the path P.

As noted above, known registration systems are limited in that they can only process receiver sheets that arrive at the registration mechanism 100 within a narrow operating time window. The present invention provides registration velocity profiles for processing sheets that arrive outside the normal operating time window.

Figure 8:
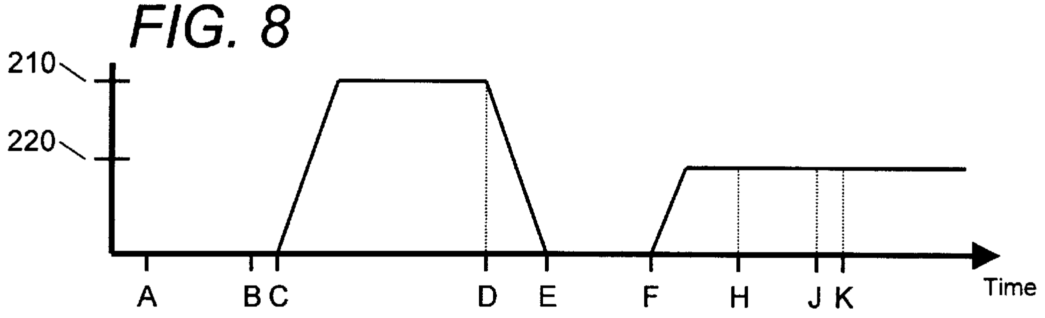
FIG. 8 is a timing diagram of a normal registration velocity profile according to known registration systems.

A timeline of a normal velocity profile is shown in FIG. 8. The timeline shows the circumferential velocity of the first and second arcuate peripheral segments 112*a*, 122*a* of the first and second drive rollers 112,122 as they engage the receiver sheet S and move it through the registration process. The process begins at time A when the registration mechanism receives a reference signal (F-PERF) indicating that the image I is at a predetermined reference location relative to the sheet touch down point. At time B, the lead edge of the receiver sheet S is detected by the nip sensors 160*a*, 160*b*. The drive rollers 112,122 then ramp up in speed at time C such that the arcuate peripheral segments 112*a*, 122*a* engage the receiver sheet S at entrance speed 210. Entrance speed 210 is a relatively high speed at which the receiver sheet S is moved toward the in-track sensors. For instance, entrance speed may be approximately 32.5 inches/second. At time D, the lead edge of the sheet S is detected by the in-track sensors. At this time, a ramp-down of the sheet speed is initiated. To correct for skew of the receiver sheet S, ramp-down for the two drive rollers 112,122 may be initiated independently, described above. At time E, when both drive rollers have completed ramp-down, the receiver sheet S will be properly oriented, and the skew will have been corrected.

After time E, the receiver sheet dwells for a period before ramping-up to web speed 220 at time F. Web speed 220 is the speed at which the receiver sheet S is delivered to the moving web W. Web speed is approximately equal to the speed at which the web W moves. For instance, web speed may be approximately 17.68 inches/second. At time H, after the receiver sheet has been ramped up to web speed 220, cross-track registration is initiated. Cross-track registration is completed before time J. At time K, the receiver sheet S touches down on the moving web W.

Figure 9A:
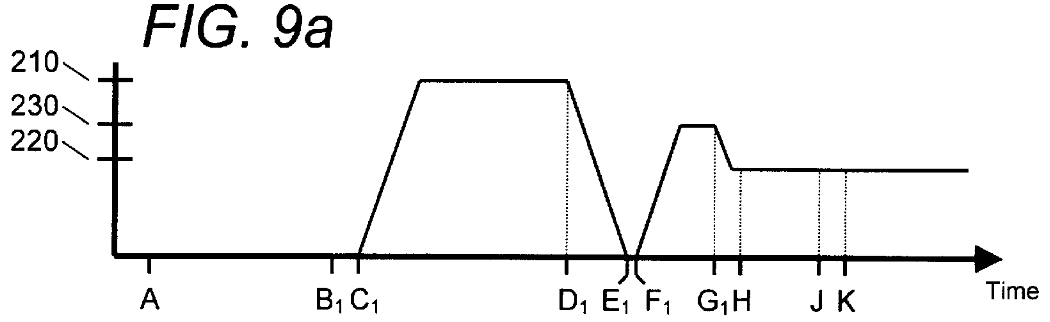
FIGS. 9*a*–9*c* are timing diagrams of registration velocity profiles for processing late-arriving receiver sheets according to various presently preferred embodiments of the invention.

The velocity profile described above provides accurate registration of receiver sheets that arrive within a narrow operating time window. This profile, however, does not provide for receiver sheets that arrive late. If a sheet arrives later than the standard operating time window, the sheet will not have time to decelerate from high speed, dwell, and accelerate to web speed at the proper time. Known registration mechanisms typically stop an incoming sheet if it arrives too late. According to one presently preferred embodiment of the invention, a first modified velocity profile is provided for properly registering sheets that arrive later than the standard operating time window. This first modified velocity profile is discussed with reference to the timeline of FIG. 9*a*.

If a receiver sheet S arrives at the registration mechanism 100 late, it will be detected at the nip sensors at a time later than expected. For instance, the receiver sheet may be detected by the nip sensors 160*a*, 160*b* at time $B_1$, which is later than the time B (FIG. 8) at which the receiver sheet would normally be detected. In this case, the receiver sheet S is behind schedule relative to the image reference signal received at time A. The image reference signal is generated in response to movement of the web W, which moves independently of the registration process. Accordingly, the receiver sheet S must make up an amount of time sufficient to account for the arrival delay in order to touch down on the web W at the proper time K. this second modified velocity profile, the receiver sheet S is detected by the nip sensors 160*a*, 160*b* at a time $B_2$, which is, again, later than expected. At time $C_2$, the drive rollers 112,122 ramp up as normal to engage the sheet S with arcuate peripheral segments 112*a*, 122*a* at entrance speed 210. The receiver sheet S is then maintained at entrance speed 210 until time $D_2$, at which time a ramp-down is initiated. However, the receiver sheet S is not brought to a stop as in previously described profiles. Instead, to make up for lost time, the receiver sheet S is ramped down directly to web speed 220. The sheet S achieves web speed 220 at time $E_2$. This second modified velocity profile is variable to account for different delays in arrival time. In particular, time $D_2$ may be adjusted such that the receiver sheet S makes up the appropriate amount of delay time to allow for touch down on the moving web W at the proper time K. The only constraints on this variability are that skew must be corrected before cross-track registration begins at time H, and the receiver sheet must achieve web speed 220 before time K, when the sheet touches down on the moving web W.

Figure 9B:
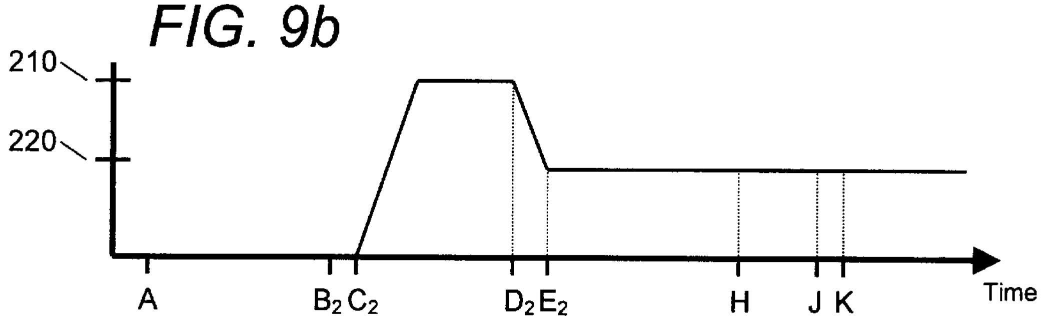
Figure 9C:
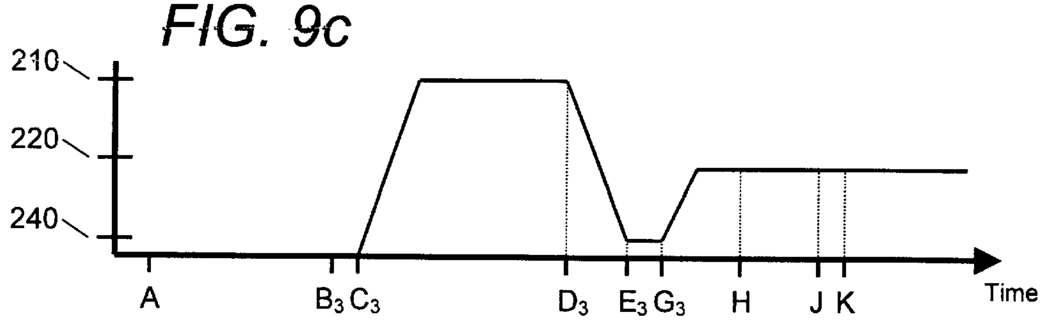

A third modified velocity profile is also contemplated for processing late-arriving receiver sheets S. This third modified velocity profile is discussed with reference to FIG. 9*c*. The sheet S again is detected by the nip sensors 160*a*, 160*b* later than expected, at time $B_3$. At time $C_3$, the drive rollers 112, 122 ramp up to engage the receiver sheet at entrance speed 210. At time $D_3$, when the receiver sheet S is detected by the in-track sensors 162*a*, 162*b*, a ramp-down is initiated. However, the receiver sheet S is not brought to a stop. Instead the receiver sheet S is ramped down to a variable speed 240. The receiver sheet S remains at this variable speed 240 until time $G_3$, when it is ramped up to web speed 220. In this third modified velocity profile, the speed 240 is variable to account for different receiver sheet delay times. For instance, to account for relatively small delays,. a lower speed 240 may be chosen; conversely, to account for relatively large delays, a higher speed 240 may be used. It should be appreciated that, if a speed 240 is chosen to be higher than web speed 220, the receiver sheet will be ramped down, rather than ramped up, to web speed 220 at time $G_3$. As in the previous velocity If a receiver sheet S arrives at the registration mechanism 100 early, it will be detected at the nip sensors at an earlier time than expected. For instance, the receiver sheet may be detected at time $B_4$, which is earlier than the time B (FIG. 8) at which the receiver sheet is normally detected. In this case, the receiver sheet S is ahead of schedule relative to the image reference signal received at time A. If allowed to proceed as normal, the early-arriving receiver sheet S might catch up with, and potentially overlap, the preceding sheet, thus causing a registration error. Accordingly, the receiver sheet S must be delayed for a period, or it must be registered in a different manner, in order to avoid registration errors and ensure that the receiver sheet S touches down on the web W at the proper time K.

When an early-arriving sheet is detected according to this fourth modified velocity profile, the registration mechanism 100 will attempt to register the sheet as normal. Accordingly, at time $C_4$, the drive rollers 112, 122 ramp up as normal to engage the receiver sheet S with arcuate peripheral segments 112*a*, 122*a* at entrance speed 210. The registration mechanism 100 then waits an appropriate amount of time to determine whether in-track detection will occur. At time $D_4$, which is later relative to time $C_4$ than time D is to time C in FIG. 8, the registration system determines that normal in-track detection did not occur. The receiver sheet S therefore is ramped down to a stop at time $D_4$. Registration and skew correction are performed using the nip sensor detection as a reference rather than in-track detection. The nip sensors 160*a*, 160*b* are typically able to detect the lead edge of the receiver sheet S even if it arrives early because at the time of nip-sensor detection, the early-arriving receiver sheet S generally has not yet caught up with the preceding sheet. Registration based upon nip-sensor detection is a slightly less precise method of registration due to the limited precision of the nip sensors and, this method of registration is typically not preferred. However, the difference in precision is relatively insignificant, and is therefore tolerable on an infrequent basis for the registration of early-arriving receiver sheets.

At the appropriate time $F_4$, the receiver sheet S is ramped up to web speed 220. It should be noted that at time $D_4$, the receiver sheet will have traveled further in the registration mechanism 100 than a receiver sheet normally would have traveled at time D (FIG. 8). This is because the early-arriving receiver sheet was maintained at entrance speed 210 for a slightly longer period, until time $D_4$, to ensure that in-track detection did not occur. To account for this positional difference, the ramp-up to web speed 220 at time $F_4$ comes later in absolute terms than time F (FIG. 8). Accordingly, the receiver sheet S spends a relatively shorter period of time at web speed 220, the positional difference is corrected, and the sheet S touches down on the moving web W at the proper time K. In the meantime, cross-track registration occurs as normal between time H and time J.

Figure 10A:
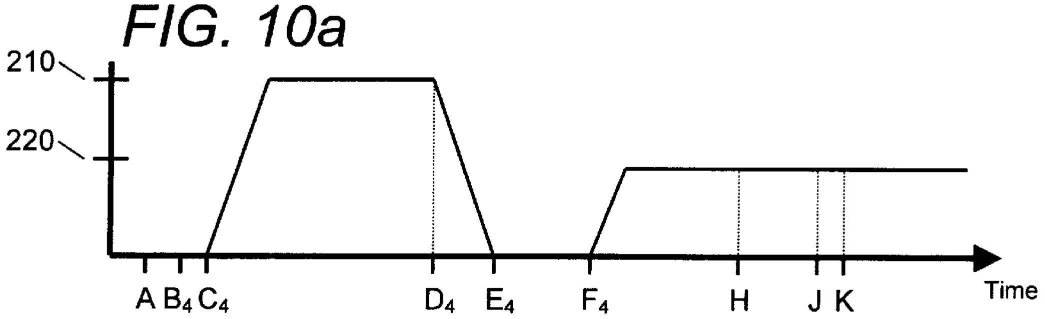
FIGS. 10*a*–10*b* are timing diagrams of registration velocity profiles for processing early-arriving receiver sheets according to various presently preferred embodiments of the invention.
Figure 10B:
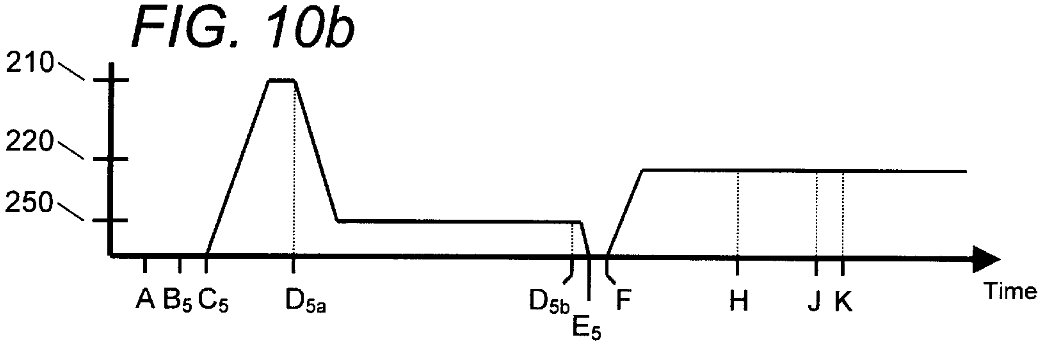

A fifth modified velocity profile is also provided for processing receiver sheets that arrive at the registration mechanism 100 too early, as shown in FIG. 10*b*. In this fifth profile, the receiver sheet S is detected at the nip sensors 160*a*, 160*b* at time $B_5$, which is, again, earlier than expected. At time $C_5$, the drive rollers ramp up as normal to engage the receiver sheet S at entrance speed 210. At time $D_{5A}$, a ramp-down is initiated. However, the receiver sheet is not brought to a complete stop as in the previous profile (FIG. 10*a*). Instead, the receiver sheet is ramped-down to speed 250, which is selected to be sufficiently low to prevent the receiver sheet S from catching up with the preceding sheet. Time $C_5$ and speed 250 may both be variable to account for varying amounts of time a receiver sheet might arrive earlier than expected.

When the receiver sheet S is detected by the in-track sensors at time $D_{5B}$, a second ramp-down is initiated, this time ending in a complete stop at time $E_5$. This allows the receiver sheet detection at the in-track sensors 162*a*, 162*b* to be used as a reference for the registration process, resulting in more registration precision than if based upon the nip-sensor detection. At time F, the receiver sheet is ramped up to web speed 220. As in all of the other profiles, cross-track registration occurs between time H and time J. The receiver sheet then touches down on the moving web W at the proper time K.

Because the first and second drive rollers 112, 122 are operated independently of one another, it is possible that entirely different velocity profiles may be used for each of them. If a receiver sheet S arrives at the registration mechanism 100 in an extremely skewed orientation, it is possible that one side of the sheet S could arrive earlier than normal and the other side could arrive later than normal. For example, nip sensor 160*a* might detect the lead edge of one end of the sheet S earlier than expected and nip sensor 160*b* might detect the lead edge of the other end of the sheet S later than expected. The present invention contemplates that the appropriate registration velocity profiles would be used to drive the first and second drive rollers 112, 122, respectively, such that the skew would be corrected. In particular, one of the first, second, or third modified velocity profiles (FIGS. 9*a*–9*c*) could be used to process the late-arriving end of the sheet S, while one of the fourth or fifth modified registration velocity profiles (FIGS. 10*a*–10*b*) could be used to process the early-arriving end of the sheet. This would result in proper skew correction and in-track alignment of the entire sheet S.

Although the invention is described with specific reference to electrophotographic apparatus and methods, the invention has broader applicability to other fields wherein registration of a moving sheet is to be made with an image-bearing member.

The invention has been described in detail with particular reference to preferred embodiments thereof and illustrative examples, but it will be understood that variations and modifications can be effected within the spirit and scope of the invention.

What is claimed is:

1. An apparatus for moving a receiver into a registered relationship with a moving image-bearing member moving at an image-bearing member speed, the apparatus comprising:

- a motor;
- a drive member to engage the receiver;
- a drive coupling connecting the motor and the drive member;
- a sensor that detects a lead edge of the receiver;
- a timer that determines an amount of time the lead edge of the receiver is detected outside of a normal operating time window; and
- a controller operative to drive the motor to control the movement of the receiver to account for the amount of time the receiver is detected outside the normal operating time window, and to deliver the receiver to the image-bearing member in register with an image.

2. An apparatus for moving a receiver having a first end section and a second end section opposite the first end section into a registered relationship with a moving image-bearing member moving at an image-bearing member speed, the apparatus comprising:

- a first drive assembly having a first motor, a first drive member, and a first drive coupling connecting the first motor to the first drive member;
- a first sensor that detects a first lead edge of the first end section of the receiver;
- a first timer that determines an first amount of time the lead edge of the first end section of the receiver is detected outside of a normal operating time window;
- a second drive assembly having a second motor, a second drive member, and a second drive coupling connecting the second motor to the second drive member;
- a second sensor that detects a second lead edge of the second end section of the receiver;
- a second timer that determines an second amount of time the lead edge of the second end section of the receiver is detected outside of a normal operating time window; and
- a controller operative to drive the first and second motors to independently control the movement of the first and second end sections of the receiver, respectively, to account for the amount of time the first and second lead edges are detected outside the normal operating time window, and to deliver the receiver to the image-bearing member in register with an image.

3. An apparatus for moving a receiver into a registered relationship with a moving image-bearing member moving at an image-bearing member speed, the apparatus comprising:

- a motor;
- a drive member to engage the receiver;
- a drive coupling connecting the motor and the drive member;
- a sensor that detects a lead edge of the receiver;
- a timer that determines an amount of delay time between an expected receiver detection time and an actual detection time at which the sensor detects the lead edge of the receiver; and
- a controller operative to drive the motor to accelerate the movement of the receiver to a speed greater than the image-bearing member speed for a period of time sufficient to account for the amount of delay time, and to decelerate movement of the sheet to deliver the receiver to the image-bearing member in register with an image.

4. An apparatus for moving a receiver into a registered relationship with a moving image-bearing member moving at an image-bearing member speed, the apparatus comprising:

- a motor;
- a drive member to engage the receiver;
- a drive coupling connecting the motor and the drive member;
- a sensor that detects a lead edge of the receiver;
- a timer that determines an amount of delay time between an expected receiver detection time and an actual detection time at which the sensor detects the lead edge of the receiver; and
- a controller operative to drive the motor to stop the movement of the receiver after a detection by the sensor, to accelerate the movement of the receiver to a speed greater than the image-bearing member speed for a period of time sufficient to account for the amount of delay time, and to decelerate movement of the receiver to deliver the receiver to the image-bearing member in register with an image.

5. An apparatus for moving a receiver into a registered relationship with a moving image-bearing member moving at an image-bearing member speed, the apparatus comprising:

a motor;

a drive member to engage the receiver;

a drive coupling connecting the motor and the drive member;

a sensor that detects a lead edge of the receiver; and a controller operative to drive the motor to stop the movement of the receiver for a period of time sufficient to maintain a gap between the receiver and a preceding receiver based on a time of detection by the sensor, and to accelerate the movement of the receiver to deliver the receiver to the image-bearing member in register with an image.

6. An apparatus for moving a receiver into a registered relationship with a moving image-bearing member moving at an image-bearing member speed, the apparatus comprising:

a motor;

a drive member to engage the receiver;

a drive coupling connecting the motor and the drive member;

a sensor that detects a lead edge of the receiver; and a controller operative to drive the motor to decelerate the movement of the receiver to a speed sufficiently low to maintain a gap between the receiver and a preceding receiver based on a time of detection by the sensor, and to accelerate movement of the receiver to deliver the receiver to the image-bearing member in register with an image.

7. A method of moving a receiver into a registered relationship with a moving image-bearing member moving at an image-bearing member speed, the method comprising the steps of:

determining that the receiver arrived at the registration mechanism an amount of time outside a normal operating time window;

controlling movement of the receiver to account for the amount of time the receiver arrived outside the normal operating time window; and delivering the receiver to the image-bearing member in register with an image.

8. A method of moving a receiver having a first end section and a second end section opposite the first end section into a registered relationship with a moving image-bearing member moving at an image-bearing member speed, the method comprising the steps of:

determining that the first end section of the receiver arrived at the registration mechanism a first amount of time outside a normal operating time window;

determining that the second end section of the receiver arrived at the registration mechanism a second amount of time outside a normal operating time window;

independently controlling movement of the first and second end sections of the receiver to account for the first and second amounts of time, respectively; and delivering the receiver to the image-bearing member in register with an image.

9. A method of moving a receiver into a registered relationship with a moving image-bearing member moving at an image-bearing member speed, the method comprising the steps of:

determining that the receiver arrived at the registration mechanism an amount of delay time later than an expected receiver arrival time;

accelerating the movement of the receiver to a speed greater than the image-bearing member speed for a period of time sufficient to account for the amount of delay time; and decelerating movement of the receiver to deliver the receiver to the image-bearing member in register with an image.

10. A method of moving a receiver as in claim 9, further comprising the steps of:

stopping the movement of the receiver for a period of time before performing the step of accelerating the movement of the receiver.

11. A method of moving a receiver into a registered relationship with a moving image-bearing member moving at an image-bearing member speed, the method comprising the steps of:

determining that the receiver arrived at the registration mechanism an amount of delay time later than an expected receiver arrival time; and decelerating movement of the receiver directly from an entrance speed to the image-bearing member speed at a time selected to account for the amount of delay time.

12. A method of moving a receiver into a registered relationship with a moving image-bearing member moving at an image-bearing member speed, the method comprising the steps of:

determining that the receiver arrived at the registration mechanism an amount of delay time later than an expected receiver arrival time;

adjusting the movement of the receiver to a variable speed for a period of time, the variable speed selected to account for the amount of delay time; and adjusting the movement of the receiver to the image-bearing member speed.

13. A method of moving a receiver into a registered relationship with a moving image-bearing member moving at an image-bearing member speed, the method comprising the steps of:

determining that the receiver arrived at the registration mechanism an amount of time earlier than an expected receiver arrival time;

stopping the movement of the receiver for a period of time sufficient to account for the amount of time by which the receiver arrived early; and accelerating movement of the receiver to deliver the receiver to the image-bearing member in register with an image.

14. A method of moving a receiver as in claim 13, further comprising the step of:

determining that the receiver was not detected by an in-track sensor before stopping the movement of the receiver for a period of time.

15. A method of moving a receiver into a registered relationship with a moving image-bearing member moving at an image-bearing member speed, the method comprising the steps of:

determining that the receiver arrived at the registration mechanism an amount of time earlier than an expected receiver arrival time;

decelerating the movement of the receiver to a speed sufficiently low to account for the amount of time by which the receiver sheet arrived early; and accelerating movement of the receiver to deliver the receiver to the image-bearing member in register with an image.

* * * * *